(12) United States Patent
Adluri

(10) Patent No.: US 7,660,939 B2
(45) Date of Patent: Feb. 9, 2010

(54) OPERATING SYSTEM ARRANGEMENT FOR FLEXIBLE COMPUTER SYSTEM DESIGN

(75) Inventor: Mohan R. Adluri, Santa Clara, CA (US)

(73) Assignee: Virinci Technologies, Inc., Santa Clara, CA (US)

( * ) Notice: Subject to any disclaimer, the term of this patent is extended or adjusted under 35 U.S.C. 154(b) by 62 days.

(21) Appl. No.: 11/189,153

(22) Filed: Jul. 25, 2005

(65) Prior Publication Data
US 2006/0026334 A1 Feb. 2, 2006

Related U.S. Application Data

(60) Provisional application No. 60/592,695, filed on Jul. 30, 2004.

(51) Int. Cl.
*G06F 13/00* (2006.01)
(52) U.S. Cl. ...................... 710/316; 710/317
(58) Field of Classification Search .......... 710/316, 710/317
See application file for complete search history.

(56) References Cited

U.S. PATENT DOCUMENTS

| | | | | |
|---|---|---|---|---|
| 4,539,637 A | * | 9/1985 | DeBruler | 719/312 |
| 5,625,780 A | * | 4/1997 | Hsieh et al. | 710/316 |
| 5,909,564 A | * | 6/1999 | Alexander et al. | 710/316 |
| 6,324,601 B1 | | 11/2001 | Webber | 710/54 |
| 6,651,131 B1 | | 11/2003 | Chong, Jr. et al. | 710/317 |
| 6,877,061 B2 | * | 4/2005 | Thibault et al. | 710/312 |
| 6,973,026 B1 | * | 12/2005 | Dyrga et al. | 370/218 |
| 2002/0154625 A1 | | 10/2002 | Ma | 370/351 |

FOREIGN PATENT DOCUMENTS

EP    1 367 486    12/2003

OTHER PUBLICATIONS

Theelen B D et al: "A scalable single-chip multi-processor architecture with on-chip RTOS kernel" Journal of Systems Architecture, Elsevier Science Publishers BV., Amsterdam, NL, vol. 49, No. 12-15, Dec. 2003, pp. 619-639.
Lebee P et al: A Heterogeneous Parallel Distributed Machine Prototype: The HPDM, vol. CONF. 6, Mar. 1987, pp. 827-834, XP000757461.
Lebee P et al: "A New Machine Architecture for Distributed Operating System", vol. 22, No. 3, May 1, 1988, pp. 187-203, XP000051661.

* cited by examiner

*Primary Examiner*—Mark Rinehart
*Assistant Examiner*—Jeremy S Cerullo

(57) ABSTRACT

A programmable logic device with an embedded operating system is disclosed. The programmable logic device includes a bus, memory, a number of bidirectional communication ports, a switching mechanism. The operating system embedded in the programmable logic device responds to input received through the ports by either sending data to a device connected to one such port, or by instructing the switching mechanism to establish a direct connection between two such ports. This device may be included as part of a larger computer system.

33 Claims, 9 Drawing Sheets

Computing System 700

Computing System 100

--Prior Art--

--Prior Art--

Computing System 200

Computer System 600

Computing System 700

140, and soundcard 150. In order to function application 110 needs to access several system resources; for this example, request 113 will be a request for a computational process to be performed and the results returned, and request 116 will be a request for a sound to be played on soundcard 150. Application 110 issues request 113 and request 116 to OS 120. In some cases, OS 120 would include application program interfaces (APIs) such as API 121 and API 123, which provide standardized handling of certain types of requests from applications like application 110. OS 120 interfaces with some hardware through the use of device drivers, such as driver 125; device drivers are specific to the piece of hardware they are associated with, and provide OS 120 with information on how to interact with that piece of hardware. In present computer systems like computer system 100, OS 120 is written to interact with a particular CPU 130 (or, at best, a class of CPUs corresponding to certain common specifications, such as x86 compatible processors), and no device driver is necessary; the functionality necessary to interact with CPU 130 (and related resources like memory 140) are integrated into OS 120.

OPERATING SYSTEM ARRANGEMENT FOR FLEXIBLE COMPUTER SYSTEM DESIGN

RELATED U.S. APPLICATIONS

This application claims priority to the copending provisional patent application Ser. No. 60/592,695, entitled "An Operating System Arrangement for Flexible Computer System Design," with filing date Jul. 30, 2004, and hereby incorporated by reference in its entirety.

BACKGROUND

1. Field of the Invention

Embodiments of this invention relate generally to operating systems and computer system architecture, and more specifically to improving system concurrence and providing additional system functionality by decoupling core operating system functions.

2. Related Art

In all but the most simplistic of computing applications, some form of operating system (OS) is present on a computing platform in order for that platform to function. The type of platform can vary greatly: for instance, desktop computers and network servers run operating systems in order to operate, but, for example, cell phones, personal digital assistants (PDAs), complex calculators, and automated teller machines (ATMs) also require an OS. And while the features made available to the user through an OS will vary significantly depending upon the platform in question, there is some commonality of function between every functional OS. In particular, every OS generally serves as the interface between the central processing unit (CPU) and the rest of the computer system.

In order for the computing system to function, the OS provides two fundamental functions. First, the OS functions as a scheduler for the CPU, in that tasks for the CPU to perform must be channeled to the CPU in a logical fashion; inherent in this function is translation, as not all CPUs have the same instruction set, i.e., accept the same instructions, and so the OS translates requests into a syntax the CPU understands. This first function is what forces an OS to be platform-specific, as supporting a different type of CPU requires supporting a different instruction set.

The second function of an OS is to be a services broker for the computing system. Applications running on the computing system, or devices connected to the system, do not need to know exactly what services are available on the system, nor exactly how to interface with the hardware resources present in the system; instead, such applications and devices need only communicate with the OS, which can forward requests to hardware or other applications as appropriate. For example, if a computer program running on the system calls for a sound to be played, the program need not know the make or model of the soundcard installed in the system, but simply tells the OS that a sound should be played; the OS will instruct the soundcard accordingly.

This concept is illustrated more fully with reference to FIG. 1A. FIG. 1A depicts a simplified overview of a prior art computer system 100. Computer system 100 is depicted as being divided into three distinct levels: application software 110, operating system (OS) 120, and hardware resources 160, which includes the central processing unit (CPU) 130, memory Several limitations are inherent to this common method of computer system design. First, as noted above, OS 120 includes the scheduler and instruction set for CPU 130. In many cases, the OS is actually optimized around a particular instruction set. As a result, most operating systems can only run on a single brand or family of processor, e.g., x86. And because application software is written to interact with the APIs of a particular OS, applications can only run on a single brand or family or processor.

A second limitation results from the duplication of effort caused by the OS itself. With reference to FIG. 1B, an example application request cycle is depicted. In step 175, at the moment when application 110 sent request 116, requesting that a sound be played, application 110 was resident in memory and performing operations on the CPU. In order for OS 120 to respond to request 116, in step 180 application 110 must suspend operations in order to allow OS 120 to access CPU 130. In step 185, OS 120 processes the request. In step 190, after request 116 is handled, OS 120 calls soundcard 150 and instructs that a given sound be played. Finally, in step 195, OS 120 suspends again and application 110 can resume executing operations on CPU 130. Essentially, the same request must be issued twice, once by application 110 and once by OS 120, before the desired effect occurs; this duplication of effort requires more CPU cycles than simply issuing an instruction once would. In a desktop computer, for example, such CPU switching functions occur extremely frequently. This duplication is traditionally an accepted limitation, as bypassing OS 120 would require every application to include the instruction set for every conceivable hardware device. OS 120, acting as a services broker, reduces the development cost of application 110, at the cost of reduced CPU efficiency.

A third limitation is inherent to the prior art approach to system architecture within computing systems. In existing computer systems, running prior art operating systems, such as OS 120, all or substantially all information transfer between devices in the computer system occurs over a single common bus, commonly referred to as a multi-drop parallel bus. As all attached devices must share this common bus, a bottleneck in data transfers exists. Continuing the example from above, when application 110 requests that a sound be played, and OS 120 passes that request to soundcard 150, a portion of the available bandwidth on the common bus is used, which reduces the available bandwidth for other operations within computer system 100.

It would be advantageous for a system to address some or all of the above limitations.

SUMMARY

An alternative operating system architecture is described. Embodiments of this architecture take several forms, and provide substantial advantages over traditional approaches to operating systems and system architecture.

In one embodiment, a programmable logic device, such as the memory controller within an existing computer system, or a dedicated microcontroller attached to a computer system, can be programmed with an operating system. This programmable logic device can thereby take over the service brokering function of the operating system. Messages are sent to the OS via the existing system bus, are processed on the programmable logic device, and an appropriate response can be implemented, all without interrupting the operations of the CPU. This embodiment can be practiced on existing architectures, or as a component of a system designed around the present invention.

A second embodiment involves a completely redesigned computer system, where the operating system, running on a programmable logic device as described previously, becomes the central point in the system. Every other component is connected directly to the OS, each with a separate bus. The OS, upon receiving a request, either handles the request by passing data to another device, or by establishing a direct connection between several attached components. Because each component is on a separate bus, communication between two components does not interfere with the available bus bandwidth of the uninvolved components, which is a significant advantage over existing architectural schemes. Additionally, as the OS is again not running on the CPU, every request handled without interrupting CPU usage represents an improvement over traditional OS implementations.

This second embodiment is extendable. Rather than being limited to traditional notions of computer system components, a system is described that implements an embodiment of the present invention where everything that might request access to the system can be treated identically. This abstracted view allows individual software applications, running on the computer system, to be treated nearly identically to how the CPU itself is handled; e.g., data is passed to an attached computing entity in accordance with a particular syntax, and is received back in accordance with a particular syntax. The OS need not be concerned with whether the entity in question is a soundcard, the CPU, or an entire self-contained computing system. This sort of "black box" approach to how the OS handles its roll as a resource broker greatly improves interoperability of components, as the OS is no longer tied to a single class or family of processor, nor is it necessary for every computing system to have its own operating system. If a resource can be connected to the OS, and the interface to the resource made available, it can be used with a minimum of effort.

Embodiments of the present invention, by decoupling the operating system, device driver and application layer intelligence, allows each of these elements to take advantage of silicon technology and evolve into better and more efficient implementations, independent of the other elements. This structure allows the operating system to become a one-time investment for use by any kind of computing devices, and also as a language or a paradigm for interconnecting computing devices, with the added benefits of improved system concurrency and flexible computer system architectures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
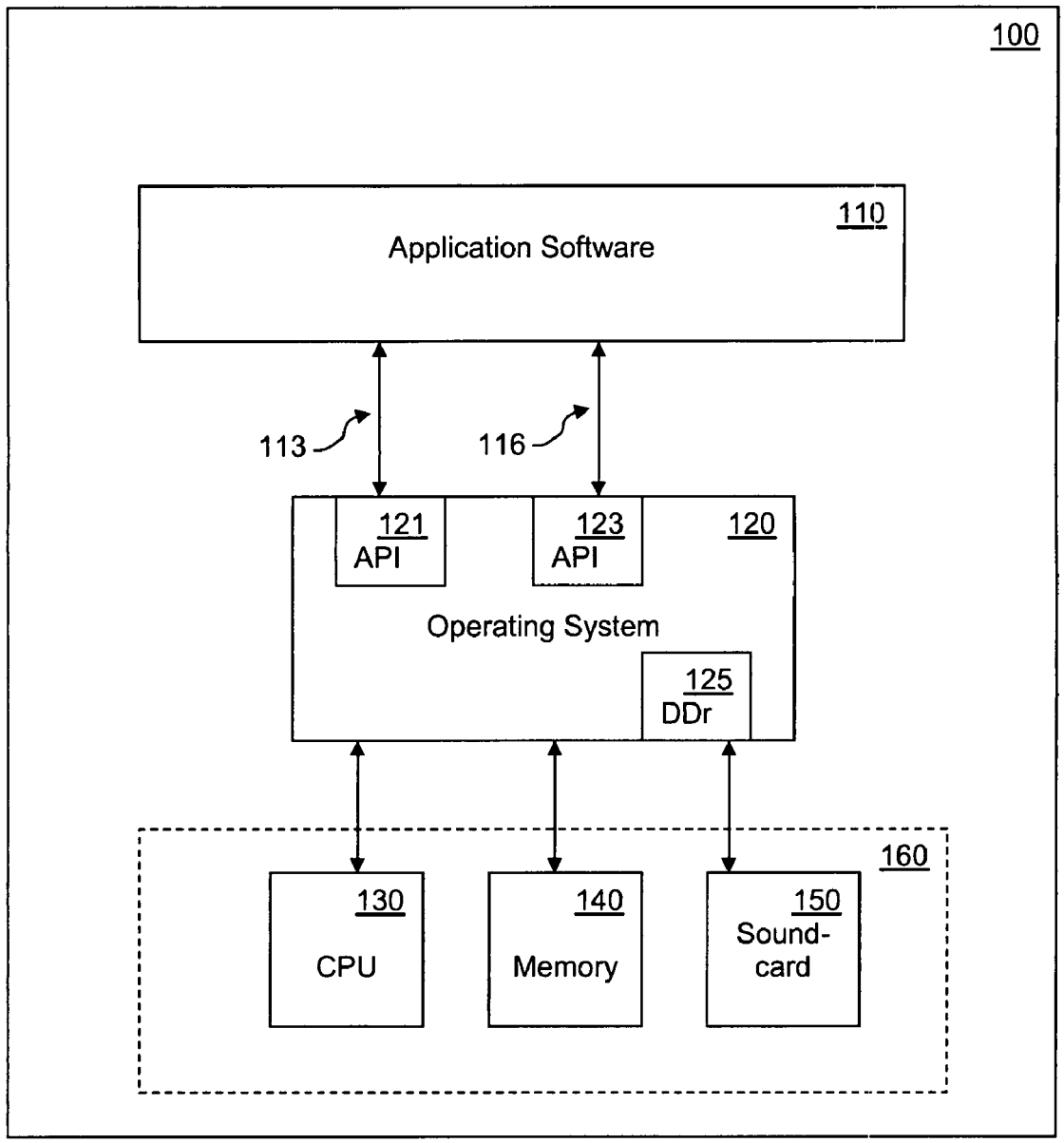
FIG. 1A is a block diagram of a prior art computer system.

A method for providing improved operating system functionality, and a system implementing this method, are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory.

These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing" "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
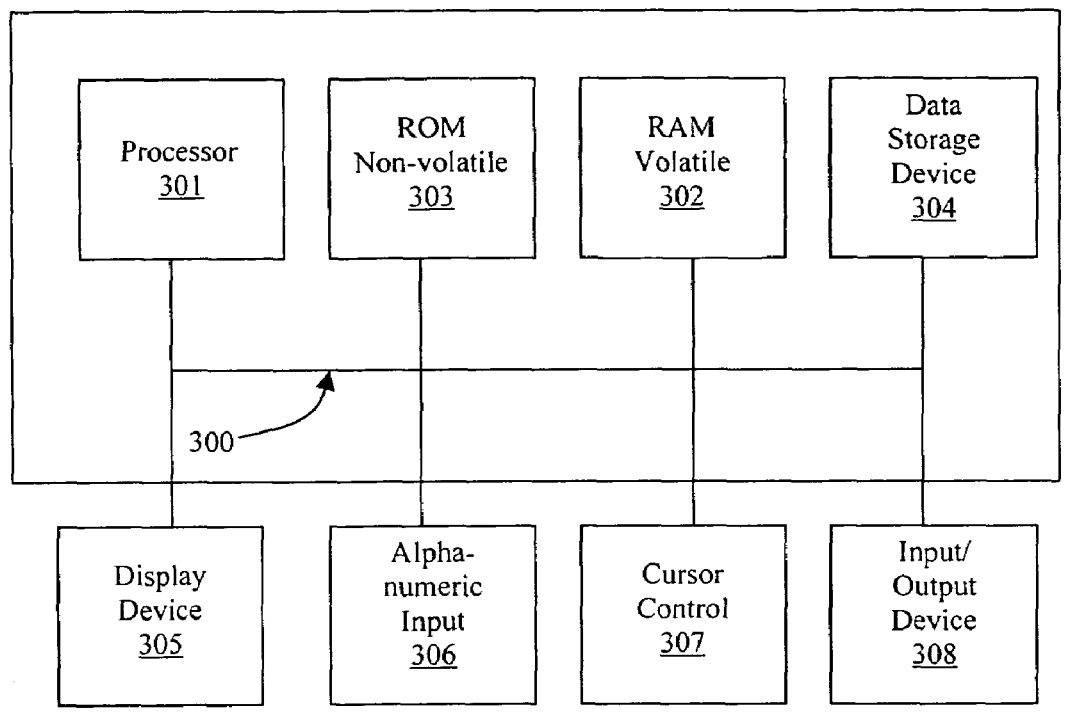
FIG. 3 is a block diagram of an exemplary computer system upon which embodiments of the present invention may be implemented.

Referring now to FIG. 3, a block diagram of an exemplary computer system 312 is shown. It is appreciated that computer system 312 described herein illustrates an exemplary configuration of an operational platform upon which embodiments of the present invention can be implemented. Nevertheless, other computer systems with differing configurations can also be used in place of computer system 312 within the scope of the present invention. That is, computer system 312 can include elements other than those described in conjunction with FIG. 3. Moreover, the present invention may be practiced on any system which can be configured to allow it, not just computer systems like computer system 312.

Computer system 312 includes an address/data bus 300 for communicating information, a central processor 301 coupled with bus 300 for processing information and instructions; a volatile memory unit 302 (e.g., random access memory [RAM], static RAM, dynamic RAM, etc.) coupled with bus 300 for storing information and instructions for central processor 301; and a non-volatile memory unit 303 (e.g., read only memory [ROM], programmable ROM, flash memory, etc.) coupled with bus 300 for storing static information and instructions for processor 301. Computer system 312 may also contain an optional display device 305 coupled to bus 300 for displaying information to the computer user. Moreover, computer system 312 also includes a data storage device 304 (e.g., disk drive) for storing information and instructions.

Also included in computer system 312 is an optional alphanumeric input device 306. Device 306 can communicate information and command selections to central processor 301. Computer system 312 also includes an optional cursor control or directing device 307 coupled to bus 300 for communicating user input information and command selections to central processor 301. Computer system 312 also includes signal communication interface (input/output device) 308, which is also coupled to bus 300, and can be a serial port. Communication interface 308 may also include wireless communication mechanisms. Using communication interface 308, computer system 312 can be communicatively coupled to other computer systems over a communication network such as the Internet or an intranet (e.g., a local area network).

Figure 2:
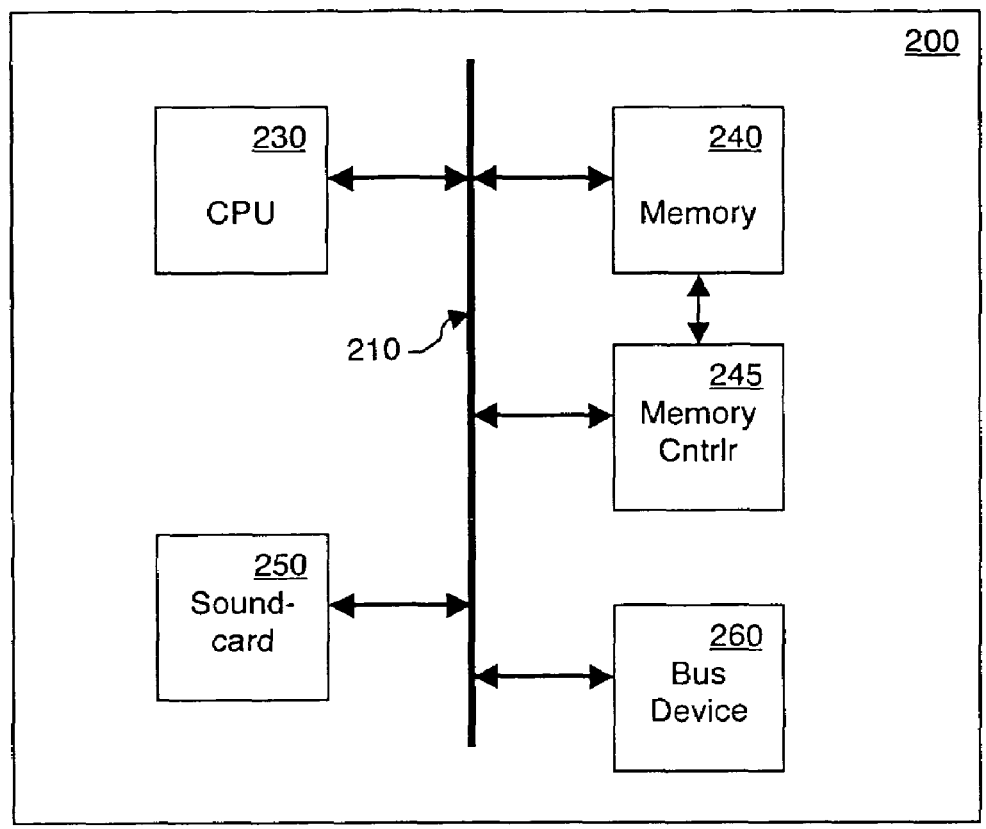
FIG. 2 is a block diagram of an exemplary computer system upon which embodiments of the present invention may be implemented.

With reference now to FIG. 2, a block diagram of an exemplary computing system 200 is shown, upon which embodiments of the present invention may be practiced. FIG. 2 depicts computer system 200 from a simplified architectural perspective. CPU 230, memory 240, soundcard 250, and bus device 260 are all interconnected by bus 210, commonly referred to as a multi-drop parallel bus. All of the attached devices must share this common bus, which imposes a speed-limiting factor on the system unrelated to the speed of CPU 230.

In developing embodiments of the present invention, the following considerations were significant. Many of the functions and services provided in a typical operating system, need not be architecture or host processor dependent. The inclusion of context switching functions and processor scheduling functions with the rest of the services provided in the operating system, bound the operating system to the host processor's architecture, in conventional systems. The inclusion of context switching and scheduling functions resulted from an attempt to treat the processor's time as a resource controlled by the operating system. The scheduling points were thus not only coordinating the computational results but also providing the processor's time as needed by the computational tasks. The roots for such an implementation stem from the historical fact that the processor was the smartest device in the system, and was best equipped to execute or implement any computational tasks.

Embodiments of the present invention developed from the perspective that application processes, threads or tasks can be viewed as types of virtual computing devices, implemented as a series of instructions to be executed by a mono acting CPU switching from one process to the other. From this perspective, context switching and scheduling functions are a means to administer operating system services, other than CPU time, and to coordinate the computational results between these virtual computing devices or computational tasks.

Given that the CPU is no longer the device best suited to implement or execute every computational task, embodiments of the present invention view the operating system as a "broker" of system resources, acting to coordinate the computational results, and leaving the actual execution of the tasks to the entities best suited to do that. For example, instead of waking up an application task and changing the processor's role from the operating system to execute an application, the operating system is limited to providing the necessary data and events to perform the application logic; the actual implementation of the application is performed by the entities best suited for that task.

Further, if processor scheduling and context switching functions are treated as a way of implementing computational abstractions or virtual computing devices, rather than an operating system provided service, an application process, task or thread essentially becomes a client for the operating system. The operating system provides services to its clients, allowing them to interact with the rest of the computational intelligence, other computational clients, or other computational devices in the system, to achieve the computer system's desired larger computational goals.

In such a paradigm, the process creation primitives like 'fork' calls are essentially a means to create new computational clients in the system and to register them with the operating system for services. And similarly, the 'exec' primitives of the OS (the primitives to load an executable image into a process's space) are simply a way by which an operating system's computational client alters its computational behavior to change the tasks it intends to perform in the system. In such a paradigm, an FPGA (Field Programmable Gate Array) being loaded with its code, a DSP being loaded with its image and a Network Processor being loaded with its micro-code, all essentially become more or less equivalent. Each may be treated like an application process being loaded with a new executable image.

Embodiments of the present invention decouple the operating system services from the actual implementation of the application logic and enable flexible implementation of the applications and computer systems. Such an arrangement allows the application level computations, whether implemented in software, hardware, or in some combination of both, to be handled like a software-based application or process within a typical operating system.

Figure 1B:
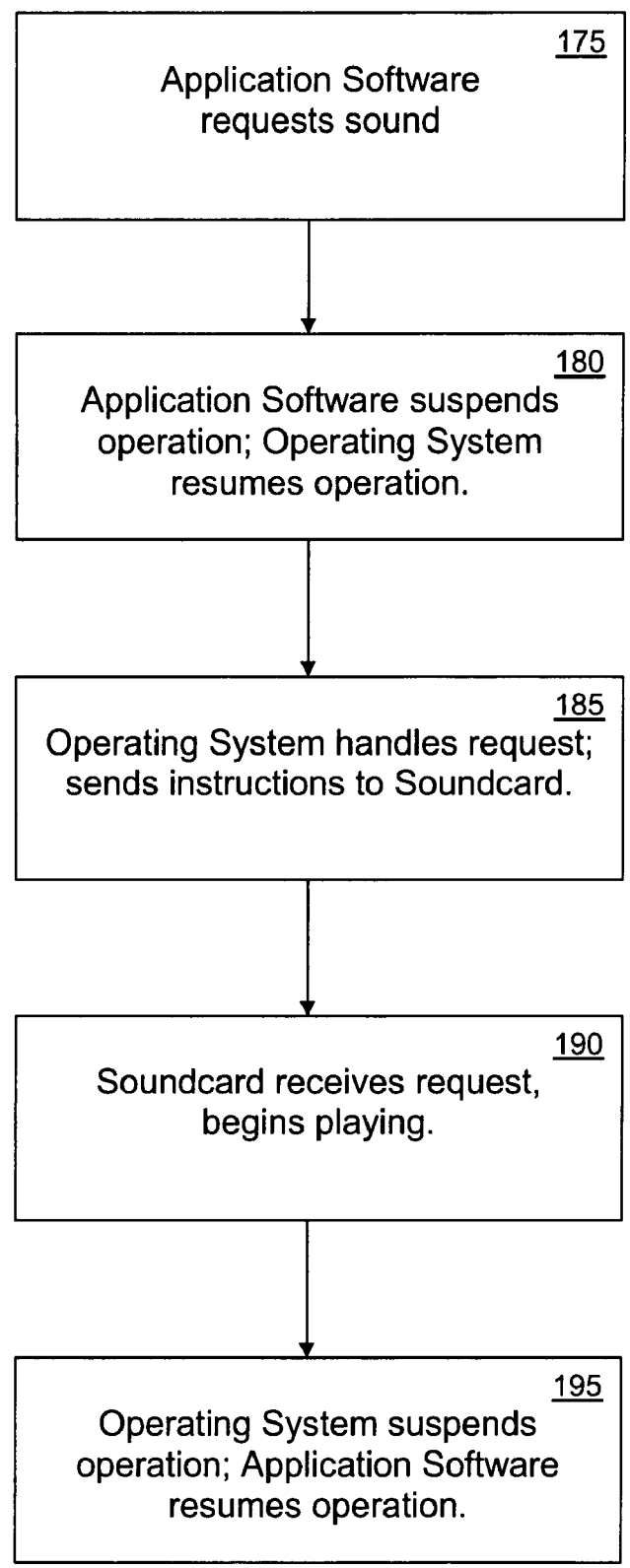
FIG. 1B is a flow diagram of an exemplary application request cycle in the prior art.
Figure 4:
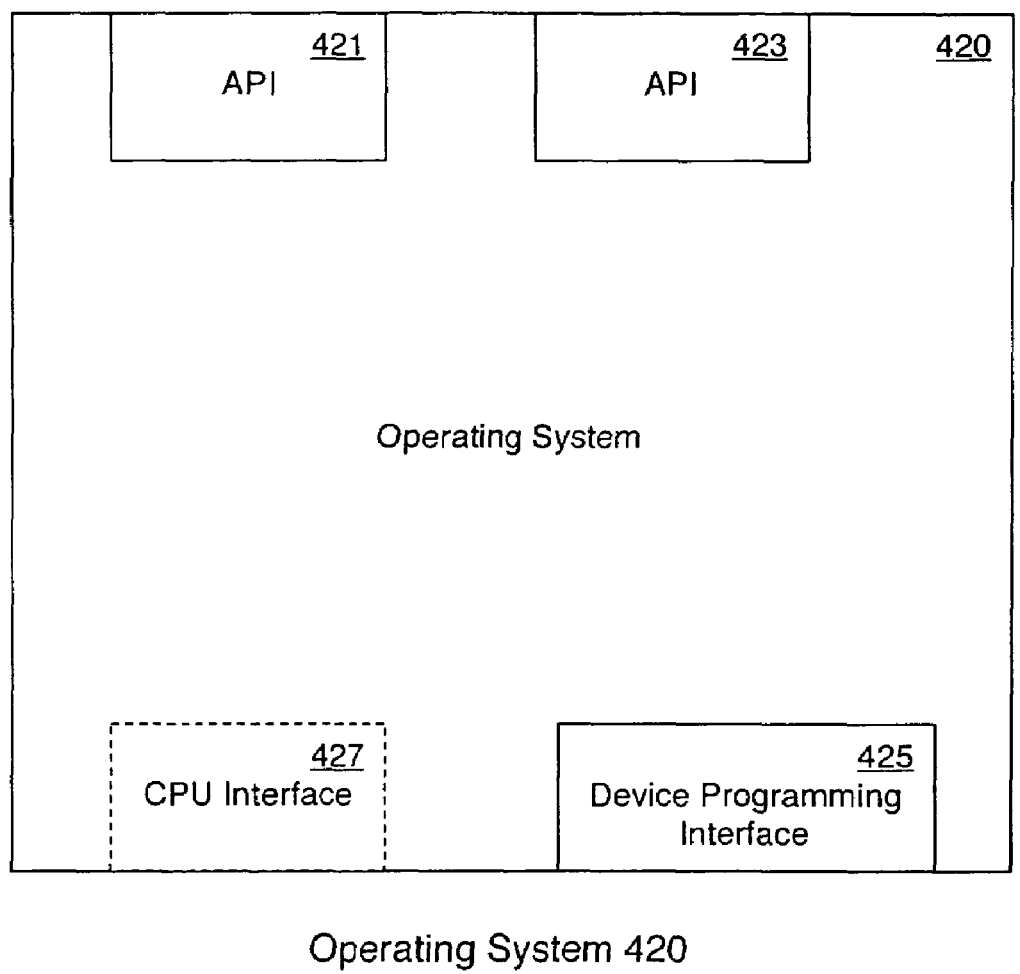
FIG. 4 is a block diagram of an operating system design, in accordance with one embodiment of the present invention.

With reference now to FIG. 4, a block diagram of Operating System (OS) 420 is depicted, in accordance with one embodiment of the present invention. OS 420 includes application programming interfaces (APIs) 421 and 423. OS 420 also includes device driver programming interface 425. OS 420 may also include optional CPU interface 427; in one embodiment, CPU interface 427 is one type of device driver programming interface. Unlike traditional operating systems, such as OS 120 (FIG. 1), this embodiment of OS 420 need not be designed to interact solely with one class or family of processors. Instead, the CPU of a computing system, such as CPU 230 of computer system 200 (FIG. 2), is treated as just another connected device, and interacted with via a device driver or similar mechanism. This has implications that become evident below. OS 420 does not include a CPU scheduler as part of the OS; instead, the CPU scheduler is also treated as a separate device, and is interacted with via a device driver or similar mechanism.

With reference now to FIGS. 2 and 4, in accordance with one embodiment of the invention, OS 420 is written to run on computer system 200. However, unlike OS 120, OS 420 is designed to be executed on a processor other than CPU 130. In one embodiment, OS 420 is executed on memory controller 245, which has computing capabilities available. In another embodiment, OS 420 is executed on a different digital logic device attached to bus 210, such as bus device 260. In one embodiment, bus device 260 is a separate, dedicated device, such as a printed circuit board with a microcontroller, programmed for OS 420 and connected to computer system 200 through a bus such as PCI Express. Any type of bus connection known in the art is acceptable for this use, and the selection of one type of bus is intended to be exemplary only. In another embodiment, bus device 260 need not be dedicated, but simply includes a digital logic device with available computing resources; a modern video card, for example, includes a very powerful processor, and could be configured in accordance with this embodiment of the present invention. In one embodiment, OS 420 is written to be a message-based operating system; e.g., OS 420 interacts with the elements of computer system 200 through sending and receiving discrete, formatted parcels of data.

Figure 5:
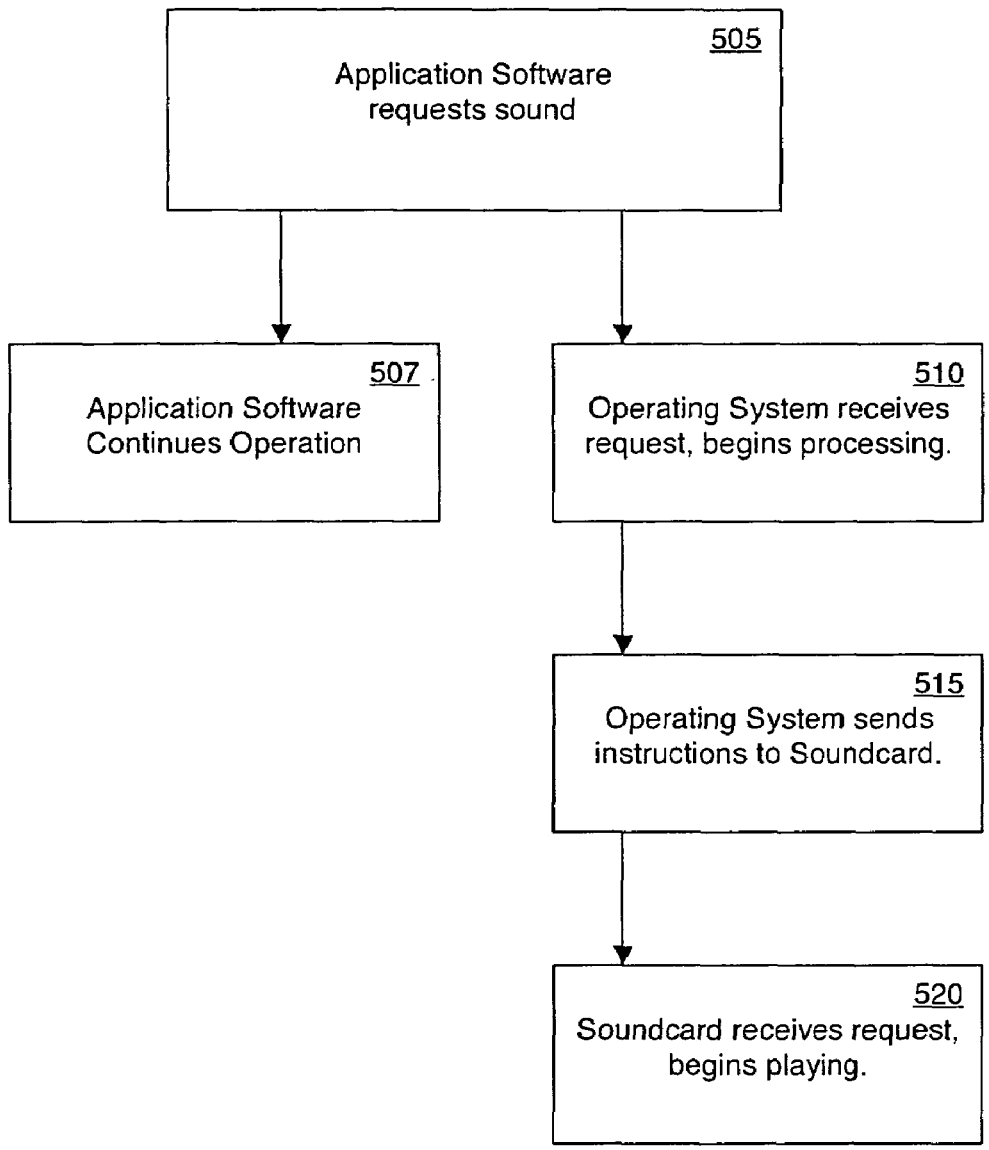
FIG. 5 is a flow diagram of an exemplary application request cycle, in accordance with one embodiment of the present invention.

With respect now to FIG. 5, an example application request cycle is depicted, in accordance with one embodiment of the present invention. In operation, running OS 420 on computer system 200 alters behavior significantly from the traditional example given previously. In this embodiment, the services broker functionality of OS 420 is not executed on CPU 230, though the CPU scheduler functionality may still need to remain on CPU 230, as such functionality is processor dependent. In step 505, an application requests that a sound be played. At the time this request is made, the application is performing operations on CPU 230. Unlike previously, however, the application does not need to suspend operations for this request to be handled, and in step 507, the application continues executing operations on CPU 130. In step 510, OS 420, performing operations on Bus Device 260, receives and handles the request without usurping CPU 230. In step 515, the request is processed and forwarded to soundcard 250. In step 520, the soundcard receives the request and starts playing the requested sound. The duplication inherent to OS 420's broker services functionality is still present, but the loss of CPU efficiency has been removed.

Figure 6:
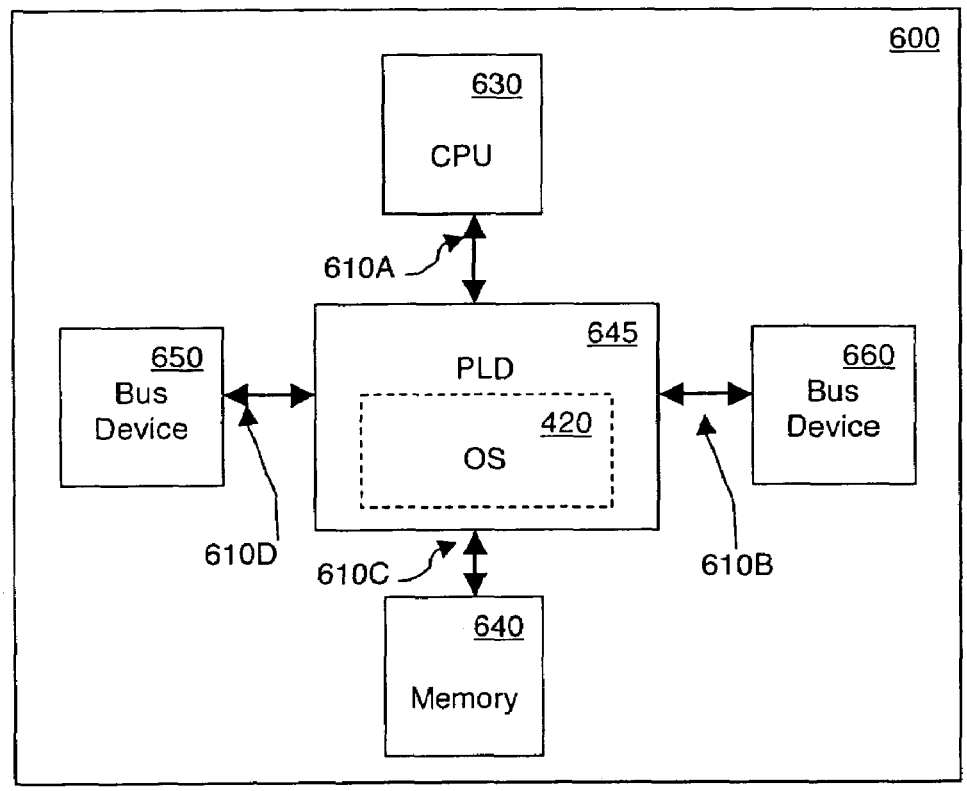
FIG. 6 is a block diagram of an exemplary computer system upon which embodiments of the present invention may be implemented.

With respect now to FIG. 6, a block diagram of a computer system 600 is depicted, in accordance with one embodiment of the present invention. In this embodiment, computer system 600 utilizes a different architecture in order to make use of the advantages offered by OS 420 computer system 600 includes CPU 630, Memory 640, several exemplary devices 650 and 660, and a programmable logic device (PLD) 645, upon which OS 420 is run. CPU 630, memory 640, and devices 650 and 660 are each connected to PLD 645 by a separate, independent bus 610. In this embodiment, PLD 645 is a dedicated chip, designed for use with OS 420. In one embodiment, PLD 645 is readily installed and removed from computer system 600, such that a single PLD 645 could be used to operate several different computer systems at different times. In other embodiments, PLD 645 is a fixed part of computer system 600.

In one embodiment, PLD 645 is designed to incorporate physical switches, such as a cross-bar switch. In another embodiment, PLD 645 is designed to incorporate logical switches. In either embodiment, the inclusion of such switching functionality in PLD 645 allows OS 420 to create direct connections between attached devices, without affecting other attached devices. For example, assume device 660 is a hard disk drive or similar permanent data storage, and that device 650 is a soundcard. An application currently running on computer system 600 could call for data currently held on device 660 to be routed to device 650, and then call for access to memory 640. OS 420 would use the switching functionality of PLD 645 to establish a direct connection between device 660 and device 650, allowing data to flow from one to the other. OS 420 would also establish a connection between memory 640 and CPU 630. In a traditional architectural scheme, such as that used on computer system 200 (FIG. 2), the shared bus 210 would create a bottleneck in the system, as the two conflicting connections would have to share the single available bus. In computer system 600, neither connection would affect the bandwidth available for the other, as each device is connected to PLD 645 with a unique bus, and PLD 645 has switch functionality to allow direct connections to be made.

With reference now to FIGS. 2 and 6, differences between the traditional CPU centric architecture paradigms and an operating system centric paradigm become apparent. FIG. 2 depicts a typical computer system 200. In computer system 200, CPU 230, memory 240, and two peripheral devices, soundcard 250 and bus device 260, are interconnected by bus 210. In computer system 200, the peripheral devices 250 and 260 are typically memory mapped or I/O mapped for CPU 230; during power-on and initialization, CPU 230 programs the devices for appropriate action. For any service requirements, the devices interrupt the operation of CPU 230 (or CPU 230 constantly polls the devices), and CPU 230 acts on to provide the devices with the required services. For example, if some data or computational result is available, bus device 260 interrupts CPU 230; CPU 230 reads the data from bus device 260, and uses it with the rest of the computations in the system. If the devices are capable of doing DMA (Direct Memory Access), CPU 230, allocates a portion of memory 240 and then provides the devices the address of the region to read from or to write to.

In the CPU centric paradigm as depicted by computer system 200, for any communication and interaction between devices, CPU 230 functions as a mediator. In this architecture, no matter how intelligent the devices can scale, all such intelligence could only be directed at making the devices more autonomous and independent of CPU 230; enabling devices to interact with other devices, without action by CPU 230, is difficult. In such an architecture as that of computer system 200, modifications to enable smarter device interconnection, results in a system with limited applications, or specific to one host processor's architecture and software.

FIG. 6 depicts computer system 600, a system with resources similar to computer system 200, but a different architecture. The arrangement of computer system 600 allows any device to be mapped into the memory of any other device connected to PLD 645. This arrangement allows the devices to be mapped to logical addresses, making the physical address, physical connections, and other such characteristics transparent to the rest of the system. A more flexible two-way mapping between the devices and the rest of the system results; not only could a device be mapped into the system, but also the system could be mapped to the device. New and rich possibilities as to how a device can participate in computer system 600 are inherent in this embodiment, depending only on the services and resources that are allowed to be negotiated and provided between the device and the operating system, directly without having to depend on CPU 630. In another embodiment, computer system 600 could be scaled back to a CPU centric model like computer system 200, if needed and depending on the intelligence of the devices, by assigning partial to full control of computer system 600 to CPU 630 on the devices and the system architecture.

Figure 7:
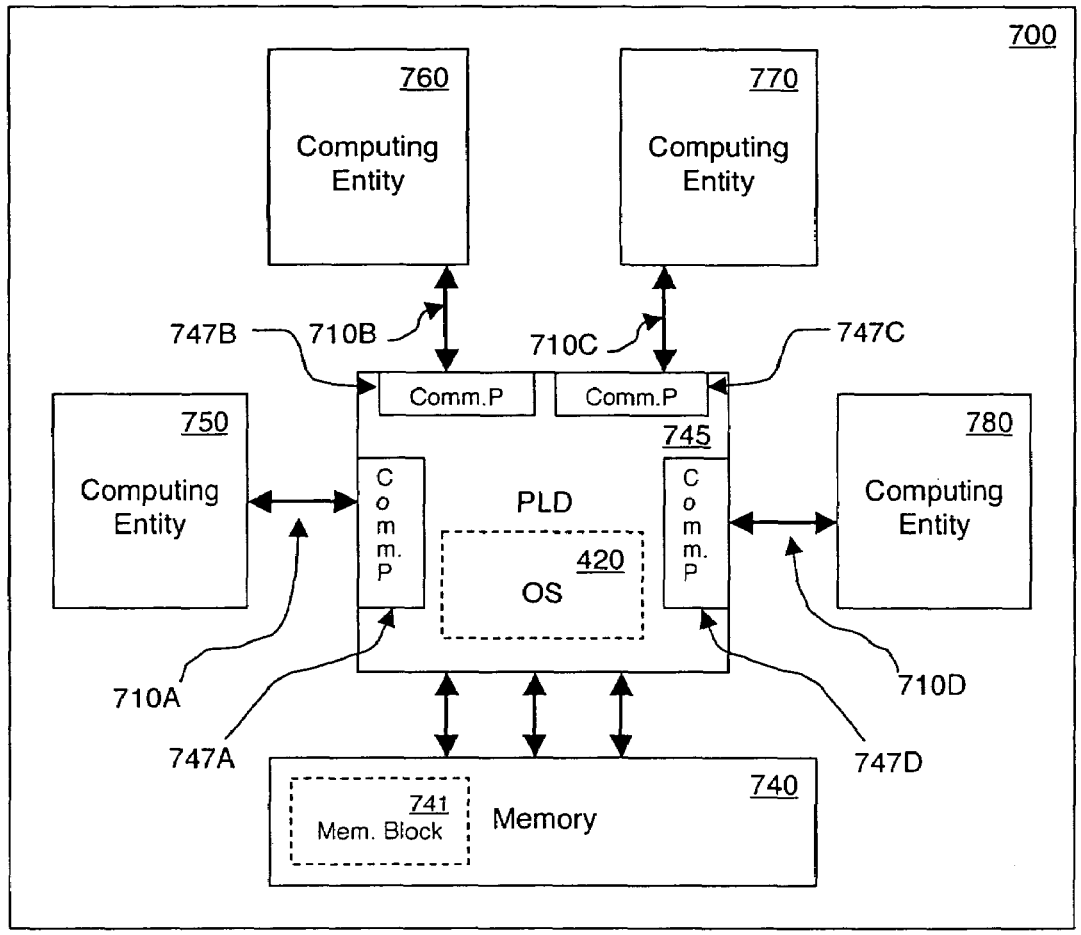
FIG. 7 is a block diagram of an exemplary computer system upon which embodiments of the present invention may be implemented.

With reference now to FIG. 7, a computing system 700 is depicted, in accordance with one embodiment of the present invention computing system 700 includes a programmable logic device (PLD) 745, on which OS 420 is run. In another embodiment, OS 420 is resident in memory 740, and controls PLD 745. PLD 745 includes some processing intelligence and some storage media, in order to store and execute OS 420. PLD 745 also includes a plurality of communication ports 747A, 747B, 747C, and 747D. The number of communication ports illustrated is merely exemplary; embodiments of this invention may be practiced with any number of communication ports. PLD 745 also includes some form of switching technology. In one embodiment, PLD 745 includes physical switching technology, such as a cross-bar switch. In another embodiment, PLD 745 includes logical switching. PLD 745 is connected to a bank of memory 740. PLD 745 is also connected to a number of computing entities 750, 760, 770, and 780. These computing entities are connected to PLD 745 by individual buses 710A, 710B, 710C, and 710D, through communication ports 747A, 747B, 747C, and 747D.

In operation, computing system 700 functions similarly to computing system 600. PLD 745 and OS 420 act as a services broker for computing system 700. A computing entity can request access to resources within computing system 700, and OS 420 will provide access. One important concept is that a computing entity can be nearly any device that can be connected to computing system 700. For example, computing entity 750 could be an application running on computing system 700, communicating with OS 420 through an API and requesting access to computing entity 760, a hard drive. Computing entities 770 and 780 might be complete computing systems, with individual CPUs, memory, and hard drives, and PLD 745 would make those resources available to any other computing entity attached to computing system 700. In such an arrangement, no computing entity needs to know exactly what resources are available in the system, or if the resources available have changed since last they were used, as OS 420 simply allocates resources as required.

In another embodiment, OS 420 does not need to know exactly what is connected to computing system 700. In this embodiment, some or all attached computing entities are treated as "black boxes." For example, if computing entity 770 was a complete computing system, all that would be needed to be provided would be the equivalent of a device driver: a listing of what resources are available to computing system 700, and how to format requests for access to them. OS 420 need not care if the CPU in computing entity is, for example, a PowerPC processor or an x86 compliant processor. Similarly, OS 420 would not care if computing entity 750 was an application running on computing entity 780, a CPU, or if computing entity 750 was a self-contained device upon which an application was running; interaction with computing entities could be simplified to essentially message passing and handling resource allocation.

In one embodiment, PLD 745 performs a switching function by establishing direct connections between computing entities when needed, without impairing other connections. For example, if computing entity 750, an application, needed access to computational results from computing entity 780, OS 420 would instruct PLD 745 to establish a direct connection between computing entity 750 and computing entity 780. This connection would not hinder or slow a previously-established connection between computing entities 760 and 770, however; each computing entity is connected to PLD 745 via its own independent connection, and no sharing of the available bandwidth is required.

In one embodiment, computing system 700 is configured to allow multiple computing systems to share a single operating system without degrading performance. In one embodiment, computing system 700 is configured to restrict access by certain computing entities to certain resources; such restriction could be for system security or to ensure availability of resources to higher-priority entities. One embodiment enforces restriction based upon which communication port is attempting to access resources. Another embodiment restricts access based upon the identity of the computing entity attempting access. In one embodiment, some or all of the computing entities attached to computing system 700 are allowed to map other computing entities or even the system itself to memory locations; this allows for more direct interaction between devices, irrespective of the physical connections involved, which provides greater system transparency.

In one embodiment, tracking and managing data flowing to and from computing entities 750, 760, 770, and 780 is accomplished through the use of process identifiers and process control blocks. Applying process identifiers and process control blocks to computing system 700 allows OS 420 to process information related to attached computing entities in the correct context. Each computing entity, when sending a request, should reference the process identity or otherwise identify the computing entity. Individual process control blocks within OS 420 could track more than one computing entity; this implementation allows multiple computing entities to share resources. Multiple computing entities can therefore be grouped into a single logical entity, and be provided with common data, resources, and context.

In another embodiment, OS 420 can allocate portions of memory 740 directly to attached computing entities. For example, memory block 741 can be assigned directly to computing entity 750. Access to memory so allocated is through the same bus used to communicate with PLD 745 and OS 420, namely bus 710A. As such, computing entity 750 receives access to both memory block 741 and the resources offered by OS 420 through the same connection. In another embodiment, a second, separate bus is used to provide attached computing entities access to memory 740.

A process control block is an operating system's way of providing a window into computer system's resources, for a process, or a computational task to compute in. In a traditional operating system's implementation, such as OS 120 (FIG. 1), when a new process is created, its process control block is created and is initialized with the starting address of execution, initial set of register values, and necessary resources and parameters. If it is ready to execute, the process is placed in the operating system's ready to run process queues. Scheduling of a process is characterized by three factors. First, what to compute, when the process is scheduled or picked out from the run queues, as is indicated by the starting address stored in the process control block (or the address to return to when after an operating system call is made). Second, who is to execute the process; in a traditional computing system, such as computer system 100, this would be CPU 130. Third, the environment or the window under which the computations are to be executed, as controlled and enforced by the operating system using process control blocks.

In symmetric multi-processor (SMP) implementations, a ready to run process could be picked to be run by any of the host processors, each of which would produce the same computational results, because all of the processors interpret the 'what to compute' part the same (the starting address and other processor specific register would mean the same to all the processors), and because such computations are done under the same environment or process control block, independent of the processor.

Embodiments of the present invention, by decoupling the process control blocks from the architecture specific 'what to compute' and 'who is computing', can flexibly and dynamically attach the same process control block (or the computational environment or the window into the computer system resources) to different computing devices for different computations, all under the umbrella of one logical process. As long as the 'what to compute' is coherently managed, the same processes could be scheduled to different computing devices.

Figure 8A:
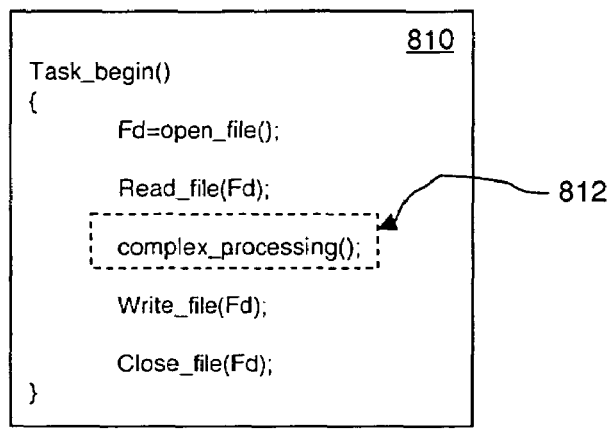
FIG. 8A is a block diagram of an exemplary application process, in accordance with one embodiment of the present invention.

With reference now to FIG. 8A, an application process is depicted. Process 810 is an application process, reading from a file and performing computing operations; in one embodiment, process 810 is performing encryption/decryption of data at step 812, and then writing back to the file. If the processing performed at step 812 can be better implemented using specialized hardware, or on a different processor with necessary capabilities, and the system hardware is modified to include such a device, then the process logic in process 810 needs to be modified to send the data read from the file to the device implementing the computational logic as a message and get the processed data back from the device and then continue on to write the processed data to the file.

Figure 8B:
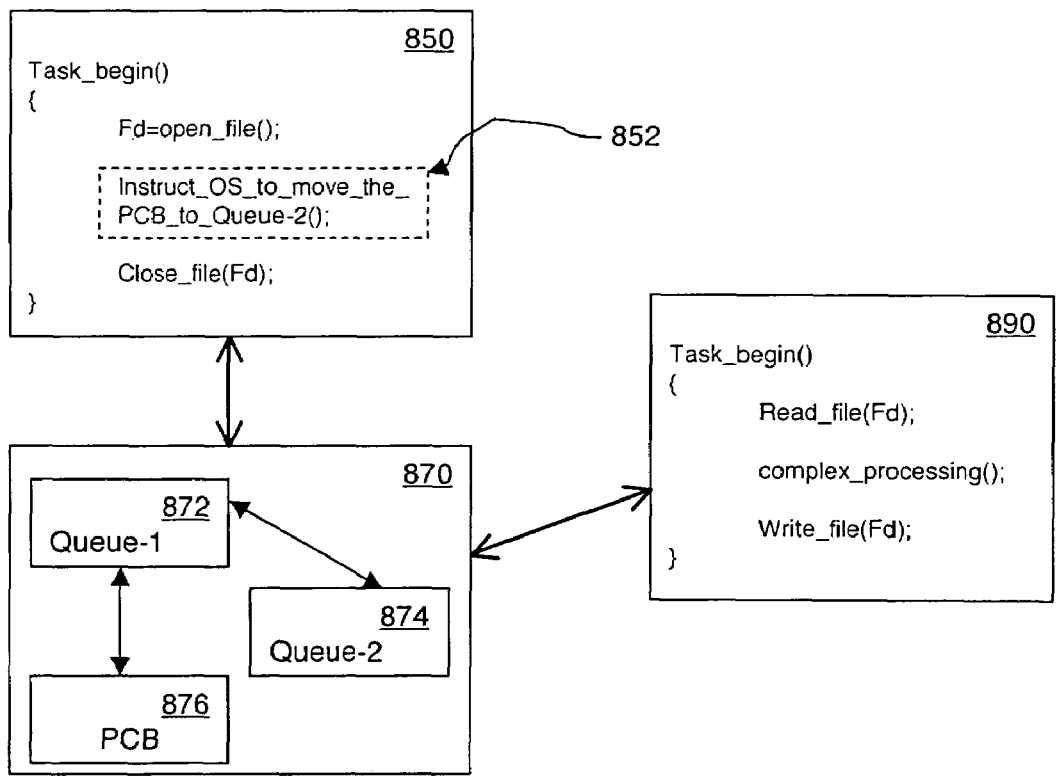
FIG. 8B is a block diagram of exemplary interactions between an operating system and two attached devices, in accordance with one embodiment of the present invention.

With reference to FIG. 8B, interactions between an operating system and two attached devices are depicted, in accordance with one embodiment of the present invention. FIG. 8B shows the possibilities using the said operating system arrangement. In this embodiment, component 870 is the combination of operating system 420 and PLD 745. Devices 850 and 890 are attached to component 870. In one embodiment, device 890 includes a scheduler, configured to remove any process control block that is queued to queue-2 874 in component 870, and against that process control block (and hence in the window provided by the operating system into the computer system's resources), performs the logic described in device 890. In device 850, the logic depicted in process 810 is modified to use a service call into the shared operating system to move the process control block corresponding to the process in the shared operating system arrangement to queue-2 870, when the required processing of the data is needed, at step 852. In one embodiment, the shared operating system of component 870 is capable of scheduling back the process control block into process 810 at step 812, after the computations in component 870 are complete, to be able to resume the task. In another embodiment, this is accomplished using queue-1, which is used to queue all control blocks that can be processed inside device 850.

Unlike the traditional client/server models, where the computational results are sent back and forth between the client and servers, the arrangement depicted in FIG. 8B allows a process to change its incarnations from one type of device to another, as needed to achieve its intended computational goals, flexibly and efficiently. Because, the process is completely re-incarnated in device 890, the logic in device 890 can be more intelligent in its processing than is possible using standard message passing mechanisms. Thus, the operating system arrangement, allows both vertical (process as a whole) and horizontal (different sections of the same process) splitting of processes, onto several computational devices around the operating system implementation. In a typical operating system implementation, the process environment is modified exclusively using operating system calls (e.g., allocating memory for the process, opening of files, network sockets or memory mapping of files or common shared resources). The operating system arrangement of component 870 allows a processor-based device 850 to setup or modify the computational environment more intelligently, and leave the actual computations to hardware device 890, where device 890 could be very efficient in computing, but may not be so efficient in invoking operating system services, and interacts with the rest of the computer system using only a limited set of operating system calls (e.g., a file read and file write as shown in the example).

In one embodiment, devices 850 and 890 are both processors. In this embodiment, the two processors may be the same, or different types. Hence the arrangement allows the processor control blocks to be moved from one scheduler queue to another, to allow different processors to compute and collaborate computational results within a single process context.

Embodiments of the present invention described above thus relate method for providing improved operating system functionality, and a system implementing this method. While the present invention has been described in particular embodiments, it should be appreciated that the present invention should not be construed as limited by such embodiments, but rather construed according to the below claims.

What is claimed is:

1. A programmable logic device for use within an electronic system having a host central processing unit, the programmable logic device comprising:
   a bus;
   a memory coupled to said bus;
   a plurality of bidirectional communication ports coupled to said bus;

a switching mechanism coupled to said plurality of communication ports;

a process control block resident in said memory, corresponding to a computing entity coupled to one of said plurality of communication ports; and software instructions resident in said memory to respond to input received from said computing entity by selecting between sending data to a device connected to one of said plurality of communication ports, and instructing said switching mechanism to establish a direct connection between two of said plurality of communication ports, wherein said software instructions are operable to allocate resources of said computing entity for use by another computing entity independent of said host central processing unit (CPU), and wherein said software instructions comprise a computing operating system.

2. The programmable logic device of claim 1 configured to be removably coupled with a computing system.

3. The programmable logic device of claim 1, wherein said switching mechanism comprises a physical switching mechanism.

4. The programmable logic device of claim 3, wherein said physical switching mechanism comprises a cross-bar switch.

5. The programmable logic device of claim 1, where said switching mechanism comprises a logical switching mechanism.

6. The programmable logic device of claim 1, wherein said software instructions are operable to execute on a plurality different computing platforms.

7. The programmable logic device of claim 1, wherein said software instructions are operable to allow horizontal splitting of processes onto a plurality of computational entities.

8. The programmable logic device of claim 1, wherein said software instructions are operable to allow vertical splitting of processes onto a plurality of computational entities.

9. The programmable logic device of claim 1, wherein said software instructions are operable to interact with central processing unit (CPU) scheduler as separate device.

10. The programmable logic device of claim 1, wherein said software instructions are operable to allow said programmable logic device to directly handle requests from said computing entity.

11. The programmable logic device of claim 1, wherein said software instructions are operable to allow multiple computing systems to share a single operating system.

12. A computing system, comprising:
a bus;
a host central processing unit (CPU) coupled to said bus;
memory coupled to said bus; and
a programmable logic device coupled to said bus, comprising:
  an internal bus;
  internal memory coupled to said internal bus;
  a plurality of bidirectional communication ports coupled to said internal bus;
  a switching mechanism coupled to said plurality of communication ports;
  a process control block resident in said internal memory, associated with a computing entity communicatively coupled to one of said plurality of bidirectional communication ports; and
  software instructions resident in said internal memory to respond to input received over one of said plurality of communication ports by selecting between sending data to a device connected to one of said plurality of communication ports, and instructing said switching mechanism to establish a direct connection between two of said plurality of communication ports, wherein said instructions are operable to allocate resources of said computing entity for use by another computing entity independent of said host central processing unit (CPU), and wherein said software instructions comprise a computing operating system operable within said programmable logic device.

13. The computing system of claim 12, wherein said programmable logic device is configured to be removably coupled to said bus.

14. The computing system of claim 12, wherein said switching mechanism comprises a physical switching mechanism.

15. The computing system of claim 14, wherein said physical switching mechanism comprises a cross-bar switch.

16. The computing system of claim 12, where said switching mechanism comprises a logical switching mechanism.

17. The computing system of claim 12, wherein said software instructions allocate access to said memory.

18. The computing system of claim 12, wherein said programmable logic device comprises a memory controller.

19. The computing system of claim 12, wherein said programmable logic device is coupled to a PCI Express bus.

20. The computing system of claim 2, further comprising a plurality of buses, coupled to said plurality of communication ports of said programmable logic device.

21. A method of handling requests and managing resources within a computing system having a host central processing unit, said method comprising:
receiving input from an attached computing entity into a programmable logic device over a bus, wherein said programmable logic device is operable to store software instructions therein;
maintaining a process control block corresponding to said attached computing entity within said programmable logic device; and
performing an action in response to receiving said input, wherein said input received and said action performed are related to a request for interaction with a resource of said computing system, and wherein said action is operable to allocate resources of said computing system for use by said attached computing entity independent of said host central processing unit (CPU), and wherein said software instructions comprise a computing operating system operable within said programmable logic device.

22. The method of claim 21, wherein said action performed comprises allocating system resources.

23. The method of claim 22, wherein said system resources allocated comprises memory of said computing system.

24. The method of claim 21, wherein said action performed is establishing a connection between two components of said computing system.

25. The method of claim 24, wherein said connection established is a physical connection.

26. The method of claim 24, wherein said connection established is a logical connection.

27. A programmable logic device, having operating system code embedded therein for causing said programmable logic device to execute a method of handling requests and managing resources within a computing system having a host central processing unit, said method comprising:
receiving input from an attached computing entity into said programmable logic device over a bus;
maintaining a process control block corresponding to said attached computing entity within said programmable logic device; and in response to said input, said operating system code causing an action to be performed, wherein said input received and said action performed are related to a request for interaction with a resource of said computing system, wherein said action is operable to allocate resources of said computing system for use by said attached computing entity independent of said host central processing unit (CPU), and wherein said operating system code is operable within said programmable logic device.

28. The method described in claim 27, wherein said action performed comprises allocating system resources.

29. The method described in claim 28, wherein said system resources allocated comprises memory of said computing system.

30. The method described in claim 27, wherein said action performed is establishing a connection between two components of said computing system.

31. The method described in claim 30, wherein said connection established is a physical connection.

32. The method described in claim 30, wherein said connection established is a logical connection.

33. The method described in claim 30, wherein said process control block can flexibly and dynamically attach the same process control block to different computing devices for different computations.

* * * * *